United States Patent [19]
Nielinger et al.

[11] Patent Number: 4,465,821
[45] Date of Patent: Aug. 14, 1984

[54] PROCESS FOR THE CONTINUOUS PRODUCTION OF POLYAMIDES

[75] Inventors: Werner Nielinger; Wolfgang Alewelt; Karl H. Hermann, all of Krefeld, Fed. Rep. of Germany

[73] Assignee: Bayer Aktiengesellschaft, Leverkusen, Fed. Rep. of Germany

[21] Appl. No.: 504,666

[22] Filed: Jun. 15, 1983

[30] Foreign Application Priority Data

Jun. 25, 1982 [DE] Fed. Rep. of Germany ....... 3223823

[51] Int. Cl.$^3$ .............................................. C08G 69/26
[52] U.S. Cl. .................................... 528/335; 528/323; 528/324; 528/340; 528/347; 528/349
[58] Field of Search ............... 528/347, 335, 340, 349, 528/324

[56] References Cited

U.S. PATENT DOCUMENTS

| 3,269,990 | 8/1966 | Wiloth et al. | 528/335 |
| 3,454,536 | 7/1969 | Schade et al. | 528/347 |
| 3,846,381 | 11/1974 | Kwok | 528/335 |
| 3,900,450 | 8/1975 | Jaswal et al. | |
| 4,163,101 | 7/1979 | Schade et al. | 528/347 |

FOREIGN PATENT DOCUMENTS 1494793 12/1977 United Kingdom .

Primary Examiner—Harold D. Anderson
Attorney, Agent, or Firm—Connolly and Hutz

[57] ABSTRACT

A process for the production of polyamides by the polycondensation of aqueous solutions of salts of diamines and dicarboxylic acids by continuously introducing the aqueous salt solution into a precondensate melt under atmospheric pressure and simultaneously distilling off the water and maintaining the temperature of the melt at a minimum temperature of 180° C.

5 Claims, No Drawings

PROCESS FOR THE CONTINUOUS PRODUCTION OF POLYAMIDES

This invention relates to a process for the continuous production of polyamides, in which the precondensation of the aqueous salt solution of diamines and dicarboxylic acids is carried out under normal pressure.

Polyamides produced from diamines and dicarboxylic acids, for example from adipic acid and hexamethylene diamine, are usually obtained by initially heating an aqueous salt solution to a temperature of from 210° to 220° C. under a pressure of about 18 bars in order to produce a water-soluble precondensate having a low molecular weight, then reducing the pressure to atmospheric pressure while simultaneously increasing the temperature and further condensing at about 270° C. until the desired molecular weight of the polyamide is achieved.

When the pressure of the reaction mixture is reduced under release of steam, the precondensate may solidify if the heat necessary for evaporation of the water is not subsequently supplied quickly enough.

According to discontinuous processes, this difficulty is usually avoided by reducing the pressure so slowly that the temperature does not fall below the solidification temperature of the precondensate. In continuously operating processes, the temperature and the pressure have to be observed carefully in order to ensure trouble-free production and to prevent solidification of the precondensate.

Thus, according to DAS No. 1,595,828, GB No. 674,954 or U.S. Pat. No. 3,846,381, the aqueous salt solution is pumped into a long, optionally expanding tube which is heated to the polycondensation temperature. Water is continuously released while the salt solution passes through the tube, the pressure continuously decreasing to atmospheric pressure. According to another known process, the aqueous salt solution is heated under a pressure of at least 10 bars and is mixed with precondensate which has already been formed. According to the teaching of U.S. Pat. No. 3,900,450, the water to be released is distilled off via a column or, as described in German Pat. No. 1,131,011, the precondensate under pressure is directed into a polyamide melt flowing through a tube and then into an evaporator or, according to Belgian Pat. No. 613,848, is directly guided into the condensate located in an evaporator. According to these methods, the heat necessary for evaporation of the water during the reduction of pressure is removed from the heat content of the melt and may be easily resupplied.

The polycondensation processes known hitherto which are to be carried out under atmospheric pressure are also not very suitable for the continuous production of amorphous polyamides from diamines and dicarboxylic acids. According to the teaching of DAS No. 1,495,393=U.S. Pat. No. 3,454,536 and DOS No. 2,627,242=U.S. Pat. No. 4,163,101 precondensates which are obtained from isophthalic acid or terephthalic acid dimethylester as acid component may be further heated under atmospheric pressure without the products solidifying. However, according to DAS No. 1,495,393, this is impossible if the dicarboxylic acids themselves are used. A number of other patent applications, for example DOS No. 2,726,262 and DOS No. 2,729,029 teach the polycondensation of salts from diamines with or without the addition of water under atmospheric pressure. However, since the salt or the oligomer which has solidified once the water has been distilled off has to be re-melted, this method is only suitable for the production of small quantities of polyamide, and is unsuitable for a continuous process on a large scale.

Surprisingly, it has now been found that it is possible to produce polyamides from salts of diamines and dicarboxylic acids, even under only atmospheric pressure, without the reaction mixture solidifying during production and thus without any remelting step, by continuously introducing the aqueous salt solution into a corresponding precondensate and preferably simultaneously distilling off the water.

Therefore, the present invention relates to a continuous process for the production of polyamides by the polycondensation of aqueous solutions of salts of substantially equimolar quantities of diamines and dicarboxylic acids, wherein under atmospheric pressure the aqueous salt solution is introduced continuously into a precondensate melt of the polyamide to be produced which melt should be maintained at a temperature of at least 180° C., preferably at least 200° C. and of which precondensate melt water is simultaneously and continuously distilled off and precondensate melt is simultaneously and continuously removed and further polycondensed in a known manner.

The process according to the present invention is preferably suitable for the production of amorphous polyamides and/or partly crystalline polyamides having a softening point of less than 230° C., preferably up to 200° C. Polyamides prepared according to this process include the polyamides of isophthalic acid and hexamethylene diamine, of isophthalic acid and trimethylhexamethylene diamine, of terephthalic acid and trimethylhexamethylene diamine or of mixtures of isophthalic acid, hexamethylene diamine and trimethylhexamethylene diamine or isophthalic acid, hexamethylene diamine and isophorone diamine. It is also possible to additionally use other diamines, dicarboxylic acids or amine carboxylic acids or lactams thereof, such as adipic acid, azelaic acid, terephthalic acid, bis-(4-aminocyclohexyl)-methane, 3,3'-dimethyl-4,4'-diaminodicyclohexylmethane, the isomeric xylylene diamines, ε-caprolactam and lauric lactam.

According to a preferred embodiment of the present invention, a preferably 50 to 90% aqueous solution of the salt provided for polycondensation is prepared by the reaction of equimolar quantities of diamines and dicarboxylic acids, and this solution is metered into a corresponding precondensate melt under atmospheric pressure and preferably under stirring. During this procedure, the salt solution is guided onto the surface of the melt or directly into the precondensate melt, and the water of the salt solution is distilled off, preferably via a column. The addition of the salt solution and the distillation of the water should be controlled such that the temperature during the precondensation is maintained at from 180° to 240° C., preferably from 200° to 230° C.

In the process of the present invention, the precondensate melt may be continuously removed from the precondensation vessel, preferably an autoclave, for example via a bottom valve, and may be further condensed in a known manner until the desired molecular weight is obtained.

The precondensation is generally carried out up to a relative viscosity (measured as described below) of from 1.1 to 1.8. Additives and auxiliaries which do not disturb polycondensation, such as lubricants, mould-release agents, dyes and pigments, may be added with the salt solution.

The polyamides which are produced according to the present invention are suitable for processing by injection moulding or extrusion on standard machines, for the production of mouldings, films, plates, fibres or bristles.

EXAMPLE 1

50 g of a 75% solution of equivalent quantities of isophthalic acid and hexamethylene diamine in water are slowly heated under nitrogen in a 500 ml three-necked flask which is equipped with a stirrer, a dropping funnel, a cooler and a bottom outlet pipe which may be sealed. As soon as most of the water has evaporated, the product solidifies at about 150° C. When the temperature is increased further, a melt is again obtained, to which more salt solution is added. The addition of the salt solution is controlled so that a temperature of 220° C. is observed and the water added with the salt solution is distilled off. Precondensate is removed from the outlet pipe corresponding to the amount of the salt solution added. In the present experiment, 50 g of salt solution were added in each case to the precondensate over a period of 75 minutes.

The relative viscosity of the removed precondensates, measured at 25° C. on a 1% solution in m-cresol in an Ubbelohde viscosimeter, is from 1.44 to 1.55.

After the addition of 3% by weight of hexamethylene diamine, the precondensate is further condensed over a period of one hour by heating to 270° C. under nitrogen. The relative viscosity (measured as described) of the polyamide is 2.3.

EXAMPLE 2

12.5 kg of a 75% aqueous solution of the salt of isophthalic acid and hexamethylene diamine which also contains 0.5% of isophthalic acid (based on the salt) to control the molecular weight are introduced into a stirrer-equipped autoclave. For the production of a precondensate melt, polycondensation is initially carried out for one hour at 210° C. under the adjusting pressure of about 18 bars. After pressure release, 6.2 kg of salt solution are added to the precondensate per hour under normal pressure. Precondensate is drawn off through a bottom valve corresponding to the quantity of salt which has been metered in. The water is distilled off via a packed column.

The precondensate has a relative viscosity of 1.2. It may be subsequently condensed up to a relative viscosity of 3.5.

The mechanical properties of the poly(hexamethyleneisophthalamide) obtained from the continuously produced precondensate do not differ from those of polyamides produced discontinuously.

In the following Table, the properties of a product which was produced from precondensate according to the present invention by further condensation at 270° C. are compared with those of discontinuously produced material.

In the table $kJ/M^2$ is an abbreviation for kilo joule per square meter, MPa is an abbreviation for milli pascal and DIN is an abbreviation for Deutsche Industrie Norm.

| Properties | Unit of measurement | Test specification | Production process according to the present invention | discontinuous |
|---|---|---|---|---|
| Impact strength | $kJ/M^2$ | DIN 53 453 | unbroken | unbroken |
| Notched impact strength | $kJ/m^2$ | DIN 53 453 | 5.3 | 4.0 |
| Limiting bending stress $\sigma$ bG | MPa | DIN 53 452 | 155 | 155 |
| Vicat softening temp. VST/B | °C. | DIN 53 460 | 123 | 125 |
| Yield stress $\sigma$ S | MPa | DIN 53 455 | 102 | 105 |
| Tear strength $\sigma$ R | MPa | DIN 53 455 | 70.5 | 65 |
| Elongation at tear $\epsilon_R$ | % | DIN 53 455 | 22.4 | 40 |
| Tension E modulus | MPa | DIN 53 457 | 2950 | 2800 |

EXAMPLE 3

A salt solution is prepared by adding 218.5 g of hexamethylene diamine and 20.43 g of isophorone diamine to a suspension of 332.3 g of isophthalic acid in 190 g of water at from 90° to 95° C. with stirring. This solution is also mixed with an excess of 11.6 g (5% by weight, based on the diamines) of hexamethylene diamine.

200 g of this solution are introduced into a three-necked flask, as in Example 1, and are heated to 270° C. over a period of 2 hours under nitrogen. During this operation, the water distills off, and the reaction product solidifies at about 190° C. At 200° C., a clear melt is again obtained. 150 ml of salt solution are added over a period of 1½ hours and the water is distilled off. The continuously removed precondensate has a relative viscosity of 1.6.

After the addition of 3% by weight of hexamethylene diamine, the precondensate is further condensed at 270° C. under nitrogen. A polyamide is obtained which has a relative viscosity of 2.8.

EXAMPLE 4

A salt is produced in 263.5 g of water from 116.3 g of isophthalic acid and 153.2 g (4% by weight of excess diamine are contained in this quantity) of bis-(4-aminocyclohexyl)-methane, at from 90° to 95° C., and 158.9 g of ε-caprolactam are added. A suspension is obtained, 300 g of which are heated to 270° C. over a period of 2 hours under nitrogen, as described in Example 1. During this operation, the water distills off, and a solid mass forms above a temperature of 110° C. A further 100 g of aqueous monomer salt solution are added to the now clear melt over a period of one hour at 270° C. The precondensate has a relative viscosity of 1.7 which, after further condensation, rises to 2.4.

We claim:

1. A continuous process for the production of polyamide which can be processed by injection molding or extrusion comprising polycondensation of an aqueous solution of salts of substantially equimolar quantities of diamine and dicarboxylic acid comprising at least one arylene dicarboxylic acid, wherein under atmospheric pressure said aqueous salt solution is continuously added to a precondensate melt of the polyamide to be produced which melt is maintained at a temperature of at least 180° C. and from which precondensate melt water is simultaneously and continuously distilled off and precondensate melt is simultaneously and continuously removed and further polycondensed to produce the polyamide.

2. A process as claimed in claim 1, wherein the precondensate melt is maintained at a temperature of at least 200° C.

3. A process as claimed in claim 1, wherein a 50 to 90% aqueous salt solution is maintained at a temperature of from 70° to 100° C.

4. A process as claimed in claim 1, wherein the precondensate has a relative viscosity of from 1.1 to 1.8 measured at 25° C. on a 1% solution in m-cresol.

5. A process as claimed in claim 1, wherein amorphous polyamide are produced.

* * * * *